(12) United States Patent
Johnson et al.

(10) Patent No.: US 8,667,734 B2
(45) Date of Patent: Mar. 11, 2014

(54) HYDROPONIC PLANT CONTAINER WITH HIGHLY OXYGENATED NUTRIENT SOLUTION USING CONTINUOUS AIR INJECTION AND CONTINUOUS CORIOLIS EFFECT MIXING

(76) Inventors: Dan Johnson, Portland, OR (US);
George Anderson, Portland, OR (US)

( * ) Notice: Subject to any disclaimer, the term of this patent is extended or adjusted under 35 U.S.C. 154(b) by 219 days.

(21) Appl. No.: 13/432,278

(22) Filed: Mar. 28, 2012

(65) Prior Publication Data

US 2013/0255152 A1    Oct. 3, 2013

(51) Int. Cl.
*A01G 31/06*    (2006.01)
*A01G 27/02*    (2006.01)
*A01G 31/02*    (2006.01)

(52) U.S. Cl.
CPC ............... *A01G 31/06* (2013.01); *A01G 31/02* (2013.01)
USPC .......................................... 47/62 R; 47/62 N

(58) Field of Classification Search
CPC ..... A01G 31/02; A01G 31/06; A01G 27/006; A01G 31/00
USPC ... 47/62 R, 62 C, 62 N, 62 E, 62 A, 59 R, 60, 47/70

IPC ...................... A01G 31/00,31/06, 27/00, 27/02
See application file for complete search history.

(56) References Cited

U.S. PATENT DOCUMENTS

| | | | | |
|---|---|---|---|---|
| 5,097,627 A | * | 3/1992 | Roberts | 47/65 |
| 8,443,546 B1 | * | 5/2013 | Darin | 47/60 |
| 2009/0151248 A1 | * | 6/2009 | Bissonnette et al. | 47/59 S |
| 2010/0199555 A1 | * | 8/2010 | Pole | 47/62 R |
| 2012/0005957 A1 | * | 1/2012 | Downs, Sr. | 47/62 A |
| 2013/0067814 A1 | * | 3/2013 | Riley et al. | 47/62 R |
| 2013/0081327 A1 | * | 4/2013 | Buck et al. | 47/62 A |
| 2013/0152469 A1 | * | 6/2013 | Kao | 47/62 R |

* cited by examiner

*Primary Examiner* — Shadi Baniani
(74) *Attorney, Agent, or Firm* — Craig A. Simmermon

(57) ABSTRACT

A hydroponic plant container with a reservoir of "highly oxygenated" nutrient solution that is the result of continuous direct air injection into the bottom of the reservoir, at a specific range of trajectories, along with continuous Coriolis effect mixing. The highly oxygenated nutrient solution is used to provide a deep water culture for the lower section of the plant roots, to saturate the middle section of the plant roots with fine droplets of the highly oxygenated nutrient solution, and to saturate the growing media and the upper section of the plants roots with a continuous drip of the highly oxygenated nutrient solution.

3 Claims, 8 Drawing Sheets

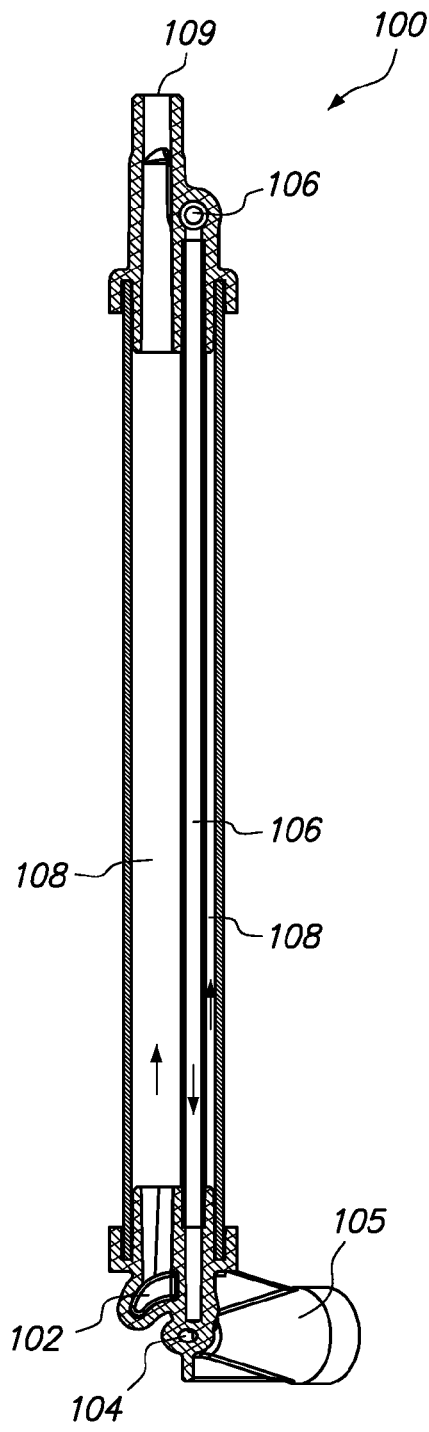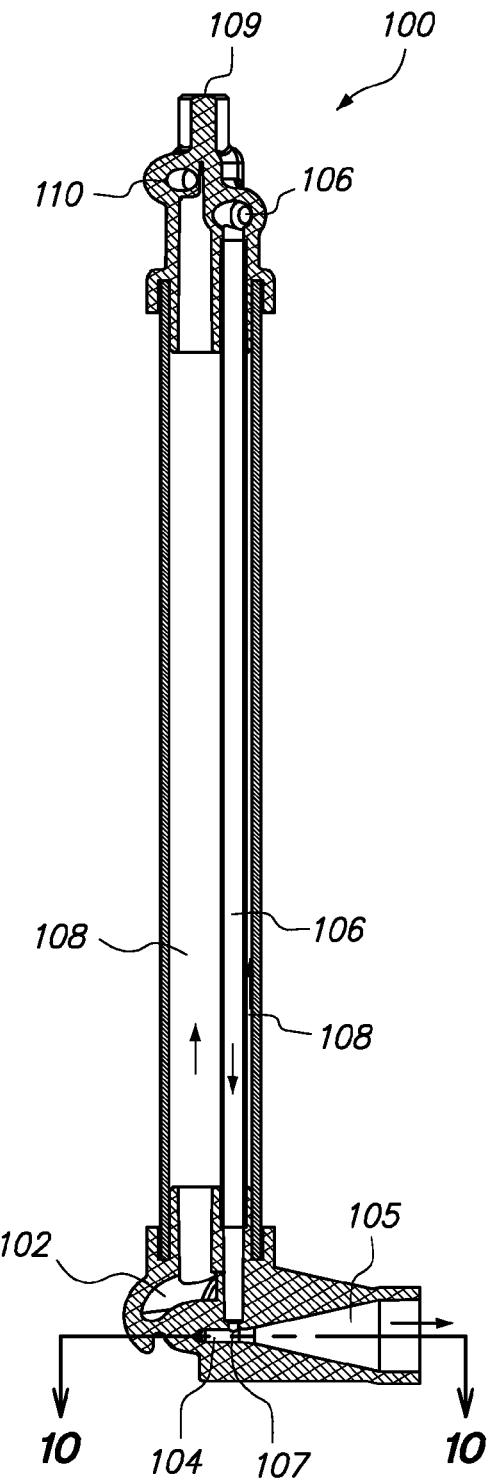

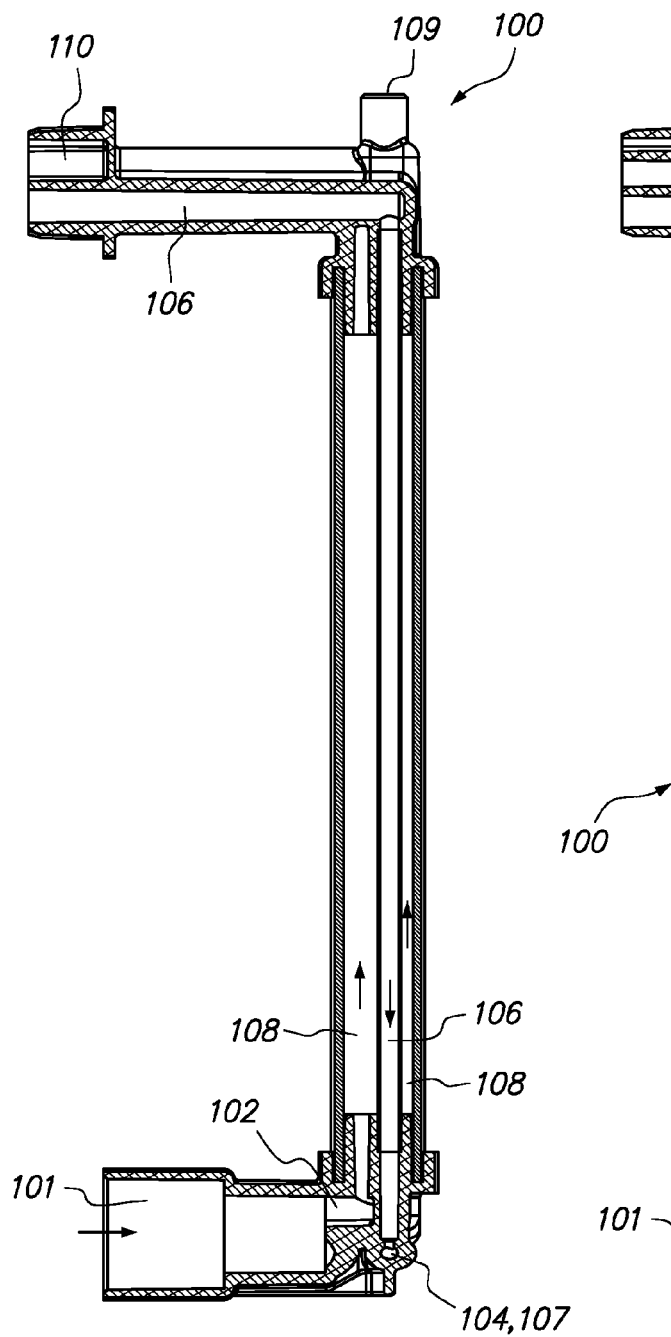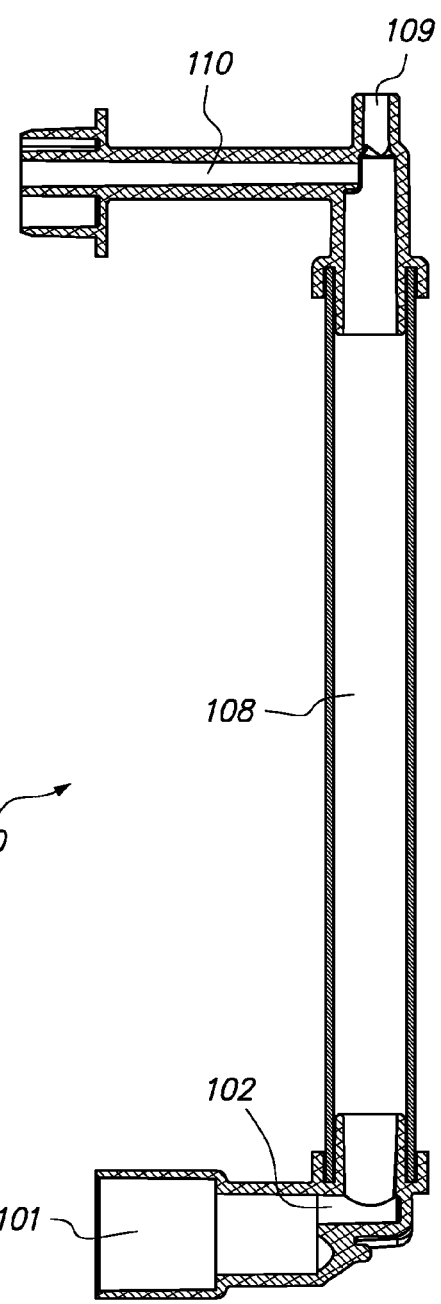

HYDROPONIC PLANT CONTAINER WITH HIGHLY OXYGENATED NUTRIENT SOLUTION USING CONTINUOUS AIR INJECTION AND CONTINUOUS CORIOLIS EFFECT MIXING

BACKGROUND OF THE INVENTION

1. Field of the Invention

This invention relates to plant containers capable of growing plants by hydroponic means. Hydroponics is a method of growing plants using an inert growing medium saturated with plant nutrient solution, where soil is not required. The plant's roots attach to or root in the inert growing medium and the plant uses the growing medium as it would use soil, to absorb nutrients required by the plant to grow and for mechanical support to hold the plant upright.

The basic elements of a hydroponic plant container are: a nutrient solution reservoir filled with a nutrient solution and a growing medium container filled with a growing medium. Nutrient solution is periodically caused to flow through the growing medium or otherwise caused to saturate the growing medium. Firmly rooted therein, the plant's roots absorb the nutrient solution and use it in the growing process of the plant.

Plants produce their own food by absorbing carbon dioxide, water, and light to produce sugars which are used by the plant to grow. This process is called photosynthesis.

In addition to sugars, plants also require mineral nutrients in order to grow. The required mineral nutrients are absorbed by the plant through its roots. It is these mineral nutrients that are the nutrients in the plant nutrient solution of a hydroponic plant container. The nutrient solution is a water based solution where the water solvent also serves as water for photosynthesis.

It has been determined that a plant's growth increases in direct proportion to: a corresponding increase in photosynthesis (light, water and carbon dioxide) and a corresponding increase in absorption of mineral nutrient by the plant's roots. Further, it has been determined that increased dissolved oxygen levels on the plant's roots, in the growing medium, and in the nutrient solution each help cause the plant to absorb mineral nutrients and absorb water faster or to absorb mineral nutrients and water at an increased rate over those without increased dissolved oxygen levels in the growing medium and/or nutrient solution.

This invention pertains to a hydroponic plant container that provides increased dissolved oxygen levels in the growing medium and on the plant's roots from increased dissolved oxygen levels in the nutrient solution in order to facilitate a substantial increase in the absorption rate of mineral nutrients and water by the plant's roots, thereby causing a corresponding increase in the rate of plant growth.

2. Description of Related Art

There are many hydroponic plant containers in the prior art and a portion of such also address the issue of increased dissolved oxygen content in the growing medium and/or in the nutrient solution. However, none of the prior art addresses these issues through the use of continuous direct air injection into the bottom of the nutrient solution reservoir using a special "hydro valve assembly" that continuously injects air into the bottom of the nutrient solution reservoir, without using an air pump, and only using the hydraulic motion of the nutrient solution in the reservoir caused by a low-power water pump and the natural force from the Earth's Coriolis effect.

This invention provides a hydroponic plant container with a reservoir of "highly oxygenated" nutrient solution that is the result of continuous direct air injection into the bottom of the nutrient solution reservoir along with continuous Coriolis effect mixing. The highly oxygenated nutrient solution is used to provide a deep water culture for the lower section of the plant roots, to saturate the middle section of the plant roots with fine droplets of the highly oxygenated nutrient solution, and to saturate the growing media and the upper section of the plants roots with a continuous drip of the highly oxygenated nutrient solution.

BRIEF SUMMARY OF THE INVENTION

It is an aspect of this invention to provide a hydroponic plant container that produces substantially increased dissolved oxygen levels in the nutrient solution through the use of direct air injection into the bottom of the nutrient solution reservoir accomplished by a specially designed "hydro valve assembly", a low power water pump, and continuous Coriolis effect mixing.

It is an aspect of the specially designed hydro valve assembly located at the bottom of the nutrient solution reservoir to continuously and directly inject air into the bottom of the nutrient solution reservoir in a way that causes natural Coriolis effect mixing of the air into the nutrient solution. This creates a continuous helical air bubble current inside the nutrient solution reservoir. The continuous helical air bubble current results in an upward flowing helical air-filled current in the nutrient reservoir that continuously stirs injected air into the nutrient solution in order to maximize the air's contact time and contact area with the nutrient solution, resulting in substantially increased dissolved oxygen levels in the nutrient solution.

It is an aspect of the specially designed hydro valve assembly to use hydraulic principles to create a low pressure area inside of the hydro valve assembly to provide a means of sucking or pulling air into the hydro valve assembly and injecting the air into the bottom of the nutrient solution reservoir that is solely powered by a minimal amount of flow of nutrient solution through the hydro valve assembly produced by a low power water pump.

It is an aspect of the specially designed hydro valve assembly to have an air intake vent that functions to vent air into the low pressure area inside the hydro valve assembly.

It is an aspect air intake vent to be water cooled before vented to the low pressure area inside the hydro valve assembly.

It is an aspect of the specially designed hydro valve assembly to inject air into the bottom of the nutrient reservoir at a specific range of trajectories to create a continuous helical air bubble current within the nutrient solution reservoir resulting from the natural Coriolis effect forces that occur in the northern hemisphere at mid-ranged latitudes, where the United States is located.

It is an aspect of this invention to provide a hydroponic plant container that distributes highly oxygenated nutrient solution throughout the root structure of the plant by: continuously soaking plant roots in a deep water culture of the highly oxygenated nutrient solution with continuous Coriolis effect mixing, continuously spraying plant roots with mist, tiny droplets, or aerosol of the highly oxygenated nutrient solution, and continuously dripping the highly oxygenated nutrient solution on top of the growing medium of the hydroponic plant container.

BRIEF DESCRIPTION OF THE DRAWINGS

FIG. 6 is a cross sectional view of hydro valve assembly taken from line 6-6 in FIG. 5.

FIG. 7 is a cross sectional view of hydro valve assembly taken from line 7-7 in FIG. 5. FIG. 7 also defines cross sectional plane 10-10.

FIG. 8 is a cross sectional view of hydro valve assembly taken from line 8-8 in FIG. 5.

FIG. 9 is a cross sectional view of hydro valve assembly taken from line 9-9 in FIG. 5.

DEFINITION LIST

| Term | Definition |
| --- | --- |
| 5 | Hydroponic Plant Container |
| 10 | Nutrient Solution Reservoir Container |
| 12 | Cylindrical Bottom |
| 14 | Elongated Narrowed Open Top |
| 20 | Highly Oxygenated Nutrient Solution |
| 30 | Growing Media Basket |
| 32 | Wide Brim Flange |
| 34 | Drainage Holes |
| 40 | Growing Media |
| 50 | Mist Valve |
| 60 | Drip Valve |
| 63 | Shut-off Valve |
| 65 | Drip Valve Feed Line |
| 68 | Air Intake Feed Line |
| 70 | Low Power Water Pump |
| 72 | Filter for Pump Input |
| 74 | Pump Input Line |
| 76 | Pump Output Line |
| 78 | Pump Power Cord |
| 80 | Reservoir Level Indicator |
| 90 | Plant Roots |
| 92 | Lower Section of Plant Roots |
| 94 | Middle Section of Plant Roots |
| 96 | Upper Section of Plant Roots |
| 98 | Plant Canopy |
| 100 | Hydro Valve Assembly |
| 101 | Influent Channel |
| 102 | Plant Feed Segment |
| 103 | Input Funnel Segment |
| 104 | Restriction Segment |
| 105 | Output Funnel Segment |
| 106 | Air Intake Segment |
| 107 | Air Injection Point |
| 108 | Cooling jacket Segment |
| 109 | Mist Valve Segment |
| 110 | Drip Valve Segment |
| 120 | Vortex Current Tuning Valve |
| 125 | Direction of fluid flow from Vortex Current Tuning Valve |
| 130 | Direction of Vortex Current |
| 140 | Low Pressure Center of Vortex Current |

-continued

| Term | Definition |
| --- | --- |
| 150 | Direction of Centripetal Flow |
| 160 | Direction of Coriolis Force |
| 170 | Launching Direction of Air Bubble Current |
| 175 | Launching Trajectory Angle of Air Bubble Current |

DETAILED DESCRIPTION OF THE INVENTION

Hydroponic plant container 5 comprises a nutrient solution reservoir container 10 filled to a level with highly oxygenated nutrient solution 20. The nutrient solution becomes "highly oxygenated" as a result of continuous cycling through a special "hydro valve assembly" 100, as discussed below.

Figure 1:
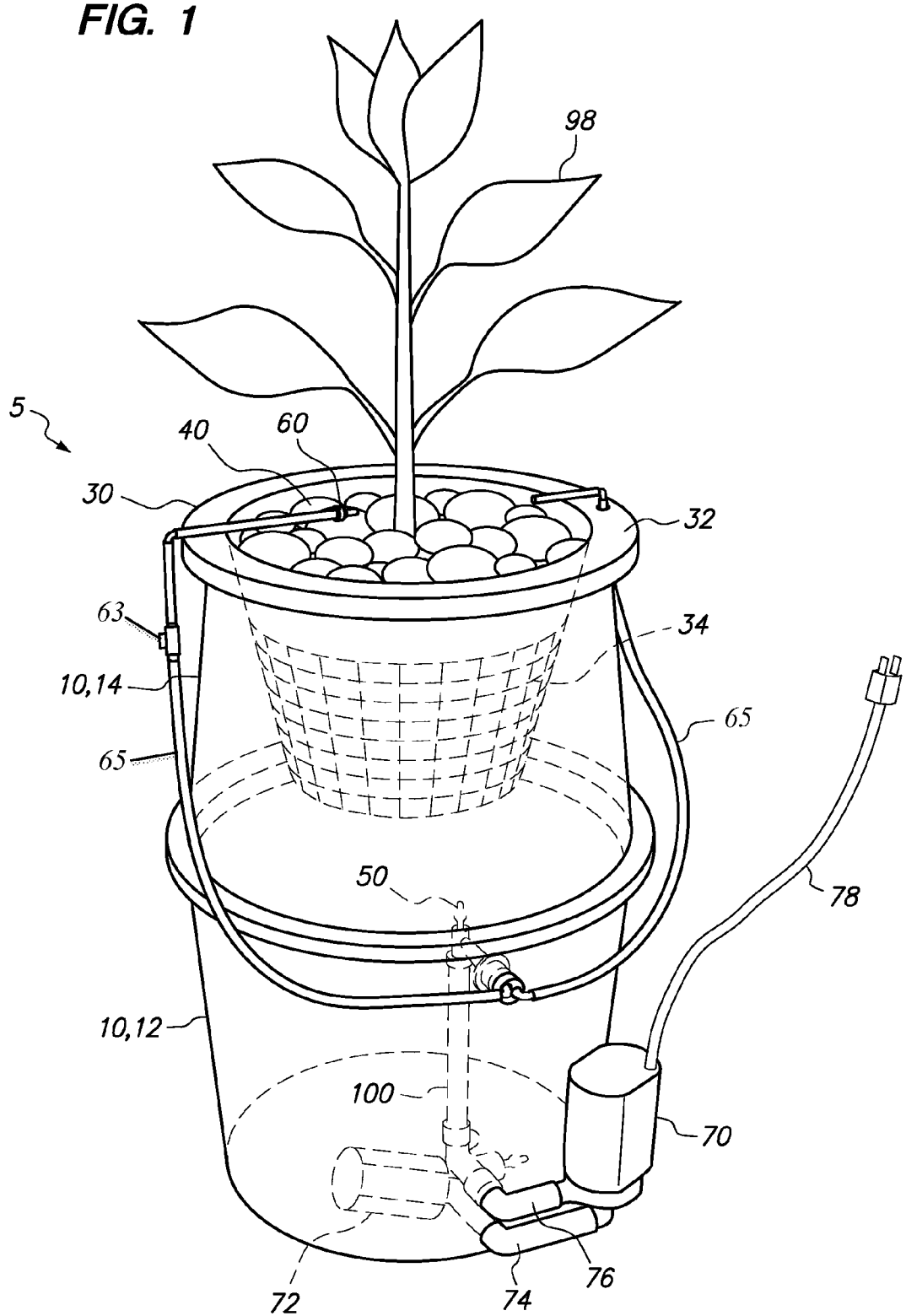
FIG. 1 is a front perspective view of hydroponic plant container, noting some internal detail with dotted lines.

Nutrient solution reservoir container 10 is a water-tight and light-tight container that can hold at least one pint of liquid. Nutrient solution reservoir container 10 has a closed cylindrical bottom 12 and an elongated narrowed open top 14. Nutrient solution reservoir container 10 is a bottle-shaped container in that it has a closed cylindrical bottom 12 and an inward tapered elongated top or bottle neck shaped top with a horizontal opening at its upper most point 14. In best mode, as depicted in FIG. 1, the particular shape of upper opening is circular. However, the particular shape of upper opening is not material to this invention. Any shape will do as long as it can meet the requirements discussed below regarding a growing media basket 30 positioned to rest on top of nutrient solution reservoir container 10 and to nest within or stack within the upper opening of elongated narrowed open top 14.

Highly oxygenated nutrient solution 20 contains mineral nutrients in liquid solution. Mineral nutrients are required by the plant to grow. Mineral nutrients are absorbed by the plant through the plant's roots 90. Highly oxygenated nutrient solution 20 is a water-based solution of: nitrogen, phosphorus, potassium, calcium, magnesium, sulfur, silicon, boron, copper, iron, chloride, manganese, molybdenum, sodium, selenium, nickel, zinc, or combination thereof. Highly oxygenated nutrient solution 20 contains a liquid solution of whatever chemicals are required by any particular plant to grow. The specific minerals or chemicals and exact proportions thereof may vary according to the particular type of plant(s) of interest. The exact chemical makeup of the nutrient solution is not material to this invention.

Hydroponic plant container 5 further comprises a growing media basket 30 filled to a level with growing media 40. Growing media basket 30 is an open-topped container with liquid drainage holes 34 along the sides and bottom of the container. The overall shape and size of growing media basket 30 must allow it to nest within or "stack" within the upper opening of elongated narrowed open top 14; growing media basket 30 must have a similar overall shape to that of the upper opening of elongated narrowed open top 14. The two members must be able to stack together where stack means that an upper core shape snuggly fits and rests within a lower cavity shape, where the core and cavity shapes are the inverses of each other to provide for this type of fit, to form a stable vertical mount or stack of the two members. The bottom of media container 30 is the upper core shape and the upper opening of elongated narrowed open top 14 is the lower cavity shape.

Growing media basket 30 further comprises a wide brim flange 32 at its open top. Wide brim flange 32 is a horizontal flange parallel with the basket's open top which functions to prevent growing media basket 30 from falling through the upper opening of elongated narrowed open top 14 when stacked therein. Wide brim flange 32 must be sturdy enough to hold the weight of growing media basket 30 filled with growing media 40 along with a rooted mature plant. Wide brim flange 32 must have an outer diameter that is greater than the inner diameter of the upper opening of elongated narrowed open top 14 so that growing media basket 30 may rest on open top of nutrient solution reservoir container 10 without falling into nutrient solution reservoir container 10 below.

As depicted, growing media basket 30 is nested within the upper opening of nutrient solution reservoir container 10, 14 so that all drainage holes 34 on growing media basket 30 are positioned within the interior of nutrient solution reservoir container 10. When nested or stacked properly, all drainage holes 34 in the growing media basket 30 are shielded from exterior light because drainage holes 34 are located within the light-tight nutrient solution reservoir container 10 and shielded from light on the top by growing media basket 30 that is filled with growing media 40.

Growing media 40 fills the growing media basket 30. Growing media 40 is a volume of many small pieces a porous solid material, where each piece is capable of absorbing liquid or water when coming into contact with the liquid or water. To prevent growing media 40 from leaking through basket 30 into container 10, growing media 40 must be sized slightly larger than the size of drainage holes 34 of growing media basket 30, or vice versa. The size of the pieces of growing media 40 and the size of the drainage holes 34 in growing media basket 30 may vary according to the root structure of the particular type of plant to be grown in hydroponic plant container 5. The size of the pieces of growing media 40 and the size of the drainage holes 34 in growing media basket 30 are not material to this invention. Any size growing media 40 and any size drainage holes 34 will do as long as the requirements listed above are met.

With proper use of the invention and with proper plant growth, the plant's roots 50 become firmly attached in growing media 40. The porous material of growing media 40 allows the plants roots to easily attach thereto. Sturdy attachment of the roots to the growing media 40 is required for proper support of the plant in an upright position.

Highly oxygenated nutrient solution 10 is continuously sprayed onto the plant's roots 90 with mist valve 50 so that highly oxygenated nutrient solution 20 saturates the plant's roots 90. Mist valve 50 and plant roots 90 are placed directly above nutrient solution reservoir 10, so that any excess highly oxygenated nutrient solution 20 not absorbed by the plants roots 90 may drip down and back into nutrient solution reservoir 10 as a result of gravity.

Also, highly oxygenated nutrient solution 20 is continuously dripped into the upper opening of growing media basket 30 from drip valve 60 so that highly oxygenated nutrient solution 20 saturates growing media 40. Drip valve 60 is fed by drip valve feed line 65. Drip valve feed line 65 may have a shut-off valve 63. Growing media basket 30 is placed directly above nutrient solution reservoir 10, so that any excess highly oxygenated nutrient solution 20 not absorbed by growing media 40 or the plants roots 90 may drip down and back into nutrient solution reservoir 10 through drainage holes 34 in the sides and bottom of growing media basket 30 as a result of gravity.

Mist valve 50 and drip valve 60 are hydraulically pressurized by low power water pump 70. Specifically, low power water pump 70 hydraulically pressurizes influent channel 101 of hydro valve assembly 100, which hydraulically pressurizes plant feed segment 102, which hydraulically pressurizes cooling jacket segment 108, which hydraulically pressurizes mist valve segment 109 and drip valve segment 110, which, in turn, hydraulically pressurize mist valve 50 and drip valve feed line 65, drip valve 60 respectively.

Low power water pump 70 is typically an electrically powered mini water pump. Low power water pump 70 is a water pump powered by any means capable of circulating the entire volume of the nutrient solution reservoir container 10 at a rate of about 3-10 times per hour. This flow rate is required to create Coriolis effect mixing and to maximize dissolved oxygen levels in the highly oxygenated nutrient solution 20, as described in more detail below. Low power water pump 70 typically has flow rate of about 25-250 gallons per hour. The required flow rate of low power water pump 70 varies according to the size of nutrient solution reservoir container 10 desired. Larger containers 10 require larger pumps 70 and vice versa. Larger containers 10 typically cost more but allow for less maintenance of the hydroponic plant container. The pump size is not material to this invention but simply must be sized correctly to yield the required flow rate through hydro valve assembly 100. Multiple hydroponic plant containers 5 may be "daisy-chained" together so that just one pump 70 feeds several hydroponic plant containers 5 that each their own hydro valve assembly 100. In this case, pump 70 would need to be more powerful because it would need to cycle highly oxygenated nutrient solution 10 through multiple hydro valve assemblies 100 and circulate multiple reservoir containers 10.

Highly oxygenated nutrient solution 20 flowing through plant feed segment 102 continues up into cooling jacket segment 108 and then on to mist valve 50 and drip vale 60 through mist valve segment 108 and drip valve segment 109 respectively. Cooling jacket segment 108 is an oblong hollow liquid-tight fluid flow chamber. Segment 108 is a "cooling jacket" because flow channel 108 completely encapsulates air intake segment 106. See FIG. 8 for a depiction of this encapsulation. Air intake segment 106 is an oblong hollow air-tight gas flow chamber nested within the cooling jacket segment 106. As discussed below, air intake segment 106 channels the injection air down to air injection point 107.

By channeling the air intake 106 to the hydro valve 100 through cooling jacket segment 108 which is filled with continuously flowing water based liquid, a water cooling system is formed where heat is taken from the intake air by thermal conduction to the cycling nutrient solution, where the removed heat is then deposited into the nutrient solution reservoir container 10. Air intake segment 106 is fed by air intake feed line 68. The cooling of intake air is beneficial because the solubility of gas increases as temperature decreases. Thus, cooler air, and the oxygen therein, can more easily dissolve in the nutrient solution as compared to warmer air. Cooling jacket segment 108 results in increased dissolved oxygen levels in the nutrient solution.

Nutrient solution becomes highly oxygenated from continuously cycling through the special hydro valve assembly 100. Continuous cycling results from the hydraulic pressure generated by low power water pump 70. Low power water pump 70 must be powered on continuously for this to occur.

A description of the flow cycle through hydro valve assembly 100 is helpful at this point of the description. For ease of discussion, both highly oxygenated nutrient solution 20 and nutrient solution without being "highly oxygenated" shall both be known as "the fluid" or "fluid" from here forward.

Figure 2:
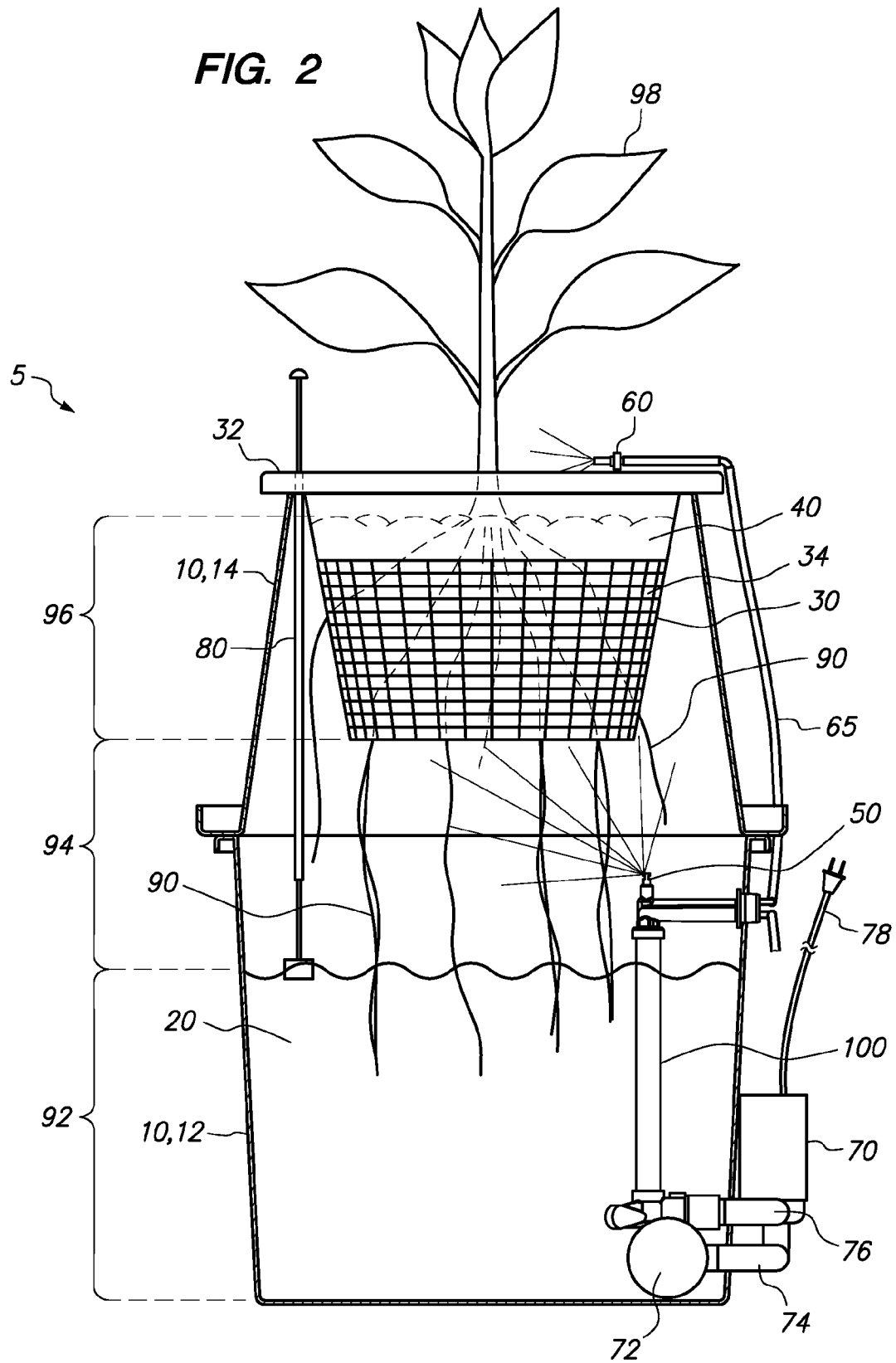
FIG. 2 is a vertical cut away view of hydroponic plant container.
Figure 3:
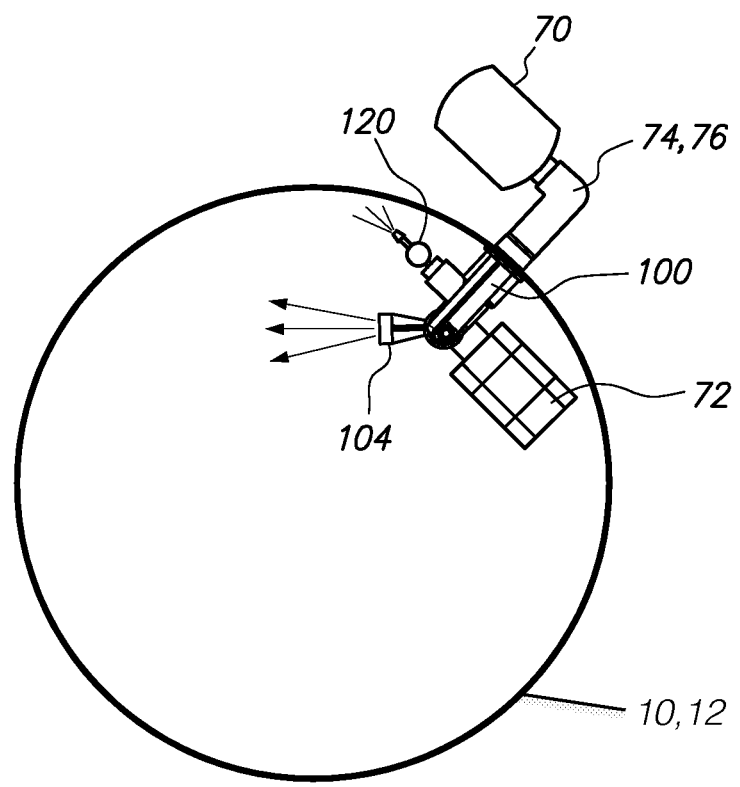
FIG. 3 is a horizontal cut away view of hydroponic plant container depicting the Coriolis effect mixing in the bottom of nutrient solution reservoir.
Figure 4:
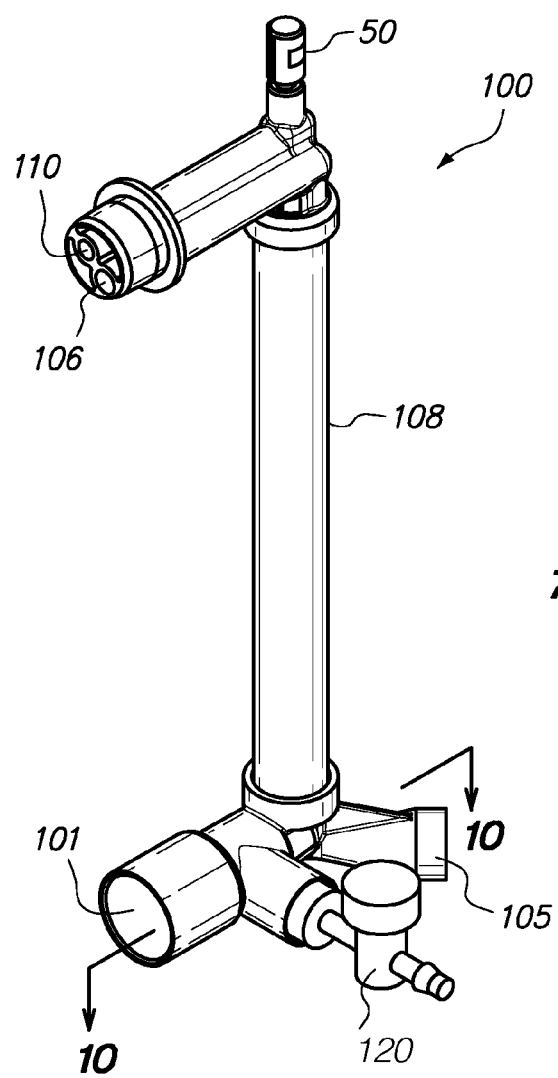
FIG. 4 is a perspective view of hydro valve assembly defining cross sectional plane 10-10.
Figure 5:
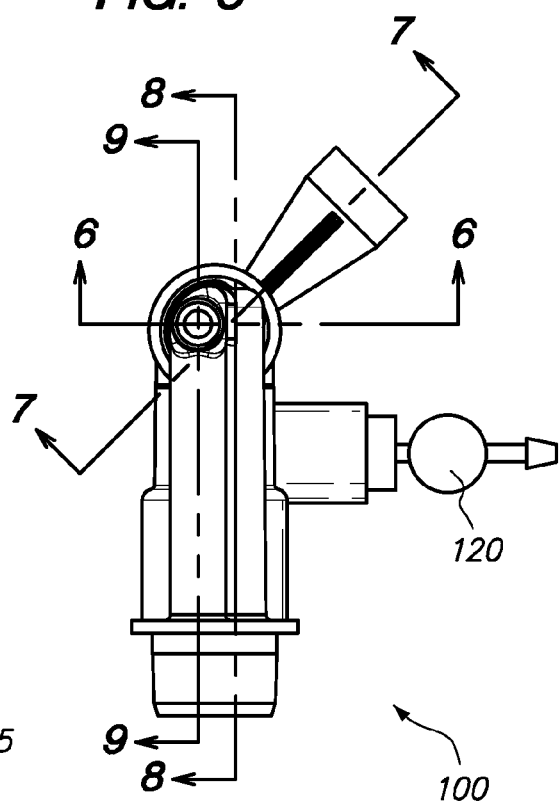
FIG. 5 is a top plan view of hydro valve assembly defining cross sectional planes 6-6, 7-7, 8-8, and 9-9.
Figure 10:
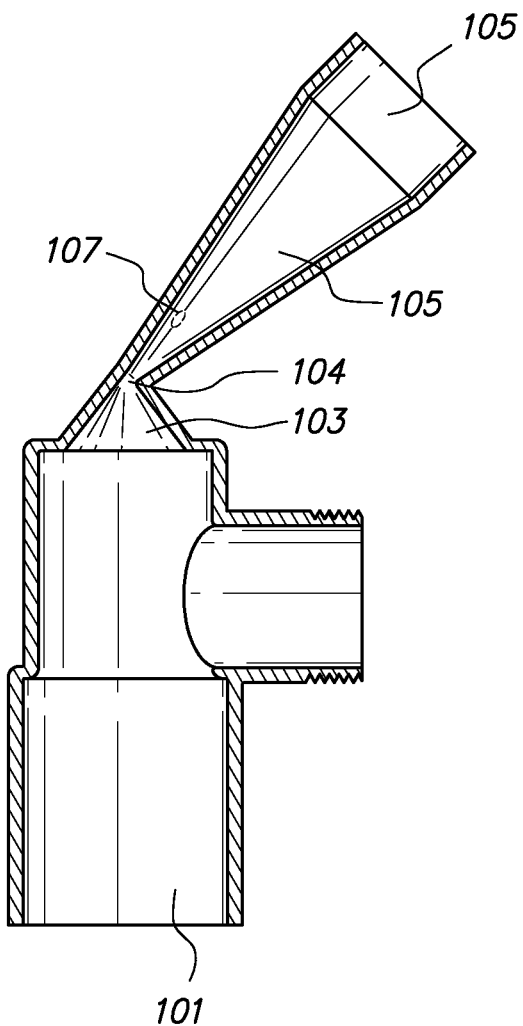
FIG. 10 is a cross sectional view of hydro valve assembly taken from line 10-10 in FIGS. 5 and 7.
Figure 11:
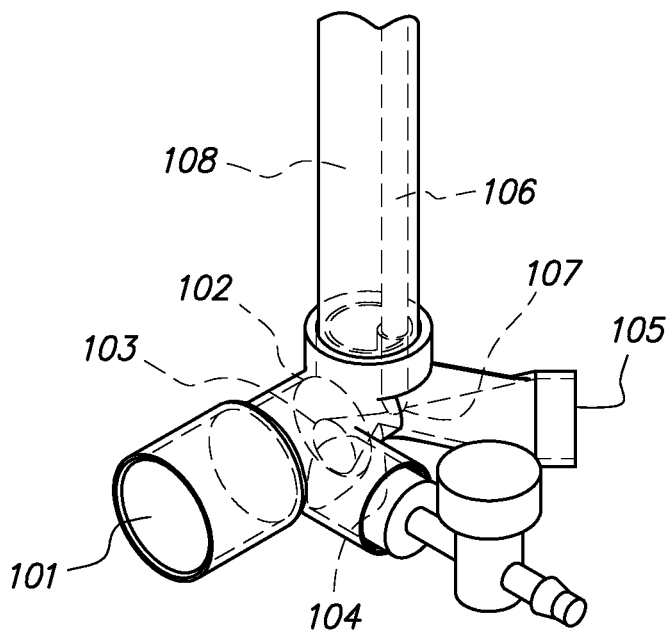
FIG. 11 a front perspective view of hydro valve assembly, depicting internal features with dotted lines, such as the plant feed segment 102 and the input funnel segment 103.

Referencing FIGS. 1-3, low power water pump 70 functions to suck or pull fluid through filter 72 located at the very bottom of nutrient solution reservoir container 10, then to pull the filtered fluid through pump input line 74 and then into low power water pump 70. On the pressurized side of low power water pump 70, the highly oxygenated nutrient solution 20 or fluid is forced through pump output line 76 and into the hydro valve assembly 100.

Referencing FIGS. 4-11, from input segment 101, the fluid is forced into one of two flow segments: plant feed segment 102 or input funnel segment 103. See FIG. 11 for one of the best depictions of the two flow segments 102 and 103. Typically, plant feed segment 102 and input funnel segment 103 each have cross sectional areas of their respective flow channels that are essentially the equal. This allows for equal hydraulic pressure on segments 102 and 103. However, the cross sectional areas of these flow channels may be varied in order to produce any desired hydraulic attributes that may help provide the desired fluid flow.

Fluid entering input funnel segment 103 is forced through restriction segment 104 where it is "injected" with air to cause oxygenation of the fluid from the oxygen in the air injection. Fluid entering plant feed segment 102 is forced into cooling jacket segment 108, where it continues on to feed the plant.

Input funnel segment 103 is a conical liquid flow chamber. Fluid enters through the large end of the cone shape and exits through a hole in the small end of the cone shape. The overall diameter of the flow path is reduced by a factor of 5-25 times so that the small end of the cone shape has an overall flow diameter that is ⅕ to 1/25 of that of the large end.

The size requirements of input funnel segment 103 vary with the size of the nutrient solution reservoir container 10. Larger nutrient solution reservoir containers 10 require more oxygenation, which requires larger hydro valves 100 with a larger input funnel segment 103. In best mode, nutrient solution reservoir container 10 is about 2-30 gallons, where input funnel segment 103 has an overall flow diameter of about 0.3-1.3" at the large end.

From input funnel segment 103, the fluid is directed through restriction segment 104. Restriction segment 104 is a cylindrical liquid flow chamber with an overall flow diameter of about 0.02-0.30". Restriction segment 104 has the same overall flow diameter as the small end or downstream end of input funnel segment 103.

Upon exiting from restriction segment 104, the fluid forced through output funnel segment 105. Output funnel segment 105 is a conical liquid flow chamber. Fluid enters through a hole in the small end of the cone shape and exits through the large end of the cone shape. The flow diameter of the large end of the cone typically matches that of the large end of input funnel segment 103. The flow diameter of the small end of the cone matches that of restriction segment 104. Thus, the two funnel segments 103 and 104 have similar flow channel area reduction ratios.

The continuous flow of fluid through the input funnel segment 103, restriction segment 104, and output funnel segment 105 creates a "Venturi effect" which functions to suck or pull air into hydro valve assembly 100 and inject it into the flow path of the fluid.

The Venturi effect is a reduction in fluid pressure at a point of increased fluid velocity. The phenomenon results from Bernoulli's equation, which states that changes in hydraulic flow pressure are indirectly proportional to changes in hydraulic flow velocity, and from the law of conservation of fluid flow, which states that flow into a pipe section equals the flow out of the pipe section. As fluid enters restriction segment 104, its velocity must increase rapidly to maintain a constant flow rate. Velocity must increase at a rate inversely proportional to the decrease in flow diameter in order to yield a constant flow. This causes a rapid pressure decrease because the flow diameter is greatly reduced as describe above. It is this pressure reduction which sucks or pulls air into hydro valve assembly 100 for direct injection into the fluid at air injection point 107.

The reduction in fluid pressure at the restriction segment causes suction to occur, so that air is sucked down through an air intake segment 106 and fed directly into restriction segment 104 at air injection point 107. From there the fluid continues through output funnel segment 105, to flow into the bottom of nutrient solution reservoir 10.

Note that only one funnel segment along with one restriction segment is required to yield the Venturi effect. Thus, one restriction segment, along with just one funnel segment 103 or 105, is all that is required to yield the suction power required for oxygenation of the fluid. In best mode, hydro valve assembly 100 comprises both an input funnel segment 103 and an output funnel segment 105 because this design produces a particular velocity gradient of fluid that yields increased suction power of air into the hydro valve assembly 100 at relatively low flow rates. Experimentation has been done by the applicants to help determine some of the best shapes of members 103, 104, and 105 to yield stronger suction at reduced flow rates. Reduced flow rates are desired because this reduces initial equipment costs and reduces equipment maintenance costs.

Air injection point 107 should be positioned along restriction segment 104, preferably the at the downstream end. Optionally, with output funnel segment 105 modes, as with best mode, air injection point 107 may be located at the upstream end of output funnel segment 105. These locations produce the largest flow velocities or otherwise yield the lowest pressure and strongest suction. Applicants have used experimentation to determine the optimum locations of the air injection point 107 along the fluid flow path that yield the largest suction power in conjunction with water pumps that are low power and low flow rate pumps.

In order for the proper Coriolis effect mixing to occur, a vortex current must be initiated in the fluid located in the cylindrical bottom 12 of nutrient solution reservoir 10. A vortex current is a cyclone current or eddy current of fluid, flowing in a counterclockwise direction around a low hydraulic pressure region at the center of the circular fluid flow. As discussed in detail below, the vortex current initiates the forces of the Coriolis effect in the proper direction to amplify the vortex current, thereby amplifying the Coriolis forces, and so on. The initiation of the vortex current creates a stable perturbation or "snowball effect" to yield a continuous vortex current around the fluid located in the cylindrical bottom 12 of nutrient solution reservoir 10. As described in detail below, this vortex current provides a type of "carrier" current to create the continuous helical air bubble current.

The vortex current is initiated by vortex current tuning valve 120. Vortex current tuning valve 120 is a valve attached to hydro valve assembly 100 and is capable of opening and closing or turning on and off the flow of fluid from influent channel 101 to nutrient solution reservoir container 10. The flow of fluid through vortex current tuning valve 120 is induced by hydraulic pressure created by low power water pump 70. Thus, low power water pump 70 initiates fluid flow through both hydro valve assembly 100 and vortex current tuning valve 120.

Figure 12:
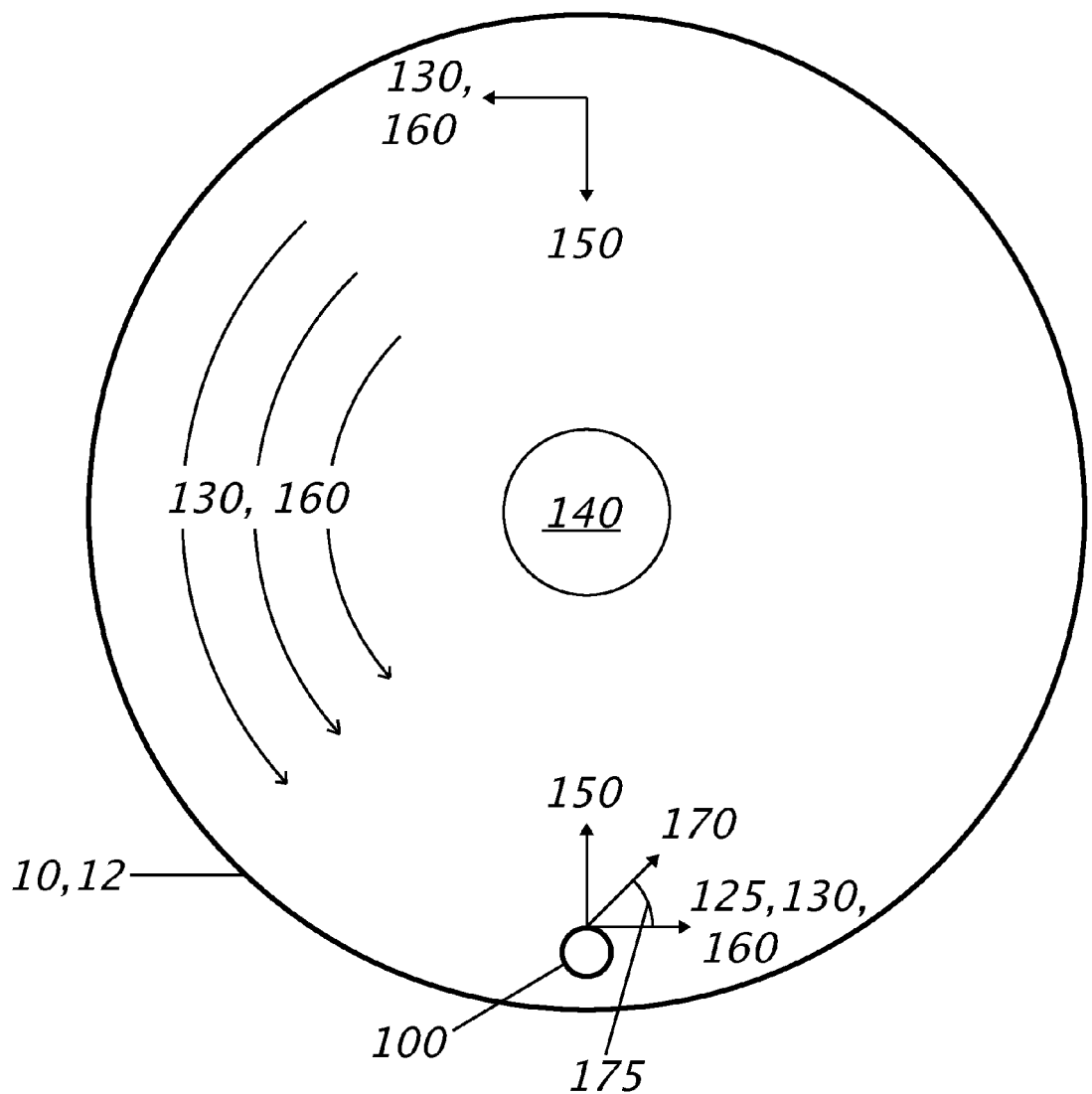
FIG. 12 is a horizontal cut away view of hydroponic plant container depicting the forces at work on the fluid in the bottom of nutrient solution reservoir.

When vortex tuning valve 120 is open, fluid flows from the valve and exits the valve to create a circular flow of fluid in a counterclockwise direction in cylindrical bottom 12. With reference to FIG. 12, the direction of fluid flowing from Vortex tuning valve 120 is depicted by arrow 125. The direction flow 125 must be horizontal and essentially tangent to the cylindrical wall of cylindrical bottom 12, notwithstanding any depictions otherwise in the patent figures. The horizontal tangential direction is required because this is the exact direction of flow that occurs in cyclonic flows at this location. The direction of arrows 125, 130, and 160 is essentially tangent to the cylindrical wall of cylindrical bottom 12.

After the vortex current is initiated, a low pressure area 140 forms in the center of the circular flow. In fact, the lowest hydraulic pressure of the whole flow system naturally forms in the center of the vortex current. This low pressure area 140 causes fluid to migrate towards the center of the circular flow because fluid naturally flows from higher to lower pressure areas. The direction of vortex migration is depicted by arrow 150 on FIG. 12. In this way, fluid is forced radially inward in the direction of 150 on all sides, due to low pressure area 140. Inward radial forces are typically called "centripetal" forces. Thus, the inward migration of fluid may be labelled as centripetal flow 150.

Centripetal flow 150, in turn, causes Coriolis forces 160 to arise. The Coriolis force is a force that causes moving objects on the surface of the Earth to veer to the right with respect to the direction of travel in the northern hemisphere, and to the left in the southern hemisphere. Coriolis force acts in a direction perpendicular to the rotation axis, perpendicular to the velocity of the body in the rotating frame, and is proportional to the object's speed in the rotating frame.

The direction of the Coriolis force is depicted by arrow 160 on FIG. 12. Centripetal flow 150 causes Coriolis forces in the direction of 160, which, in turn, amplify the speed of the vortex current 130, which, in turn, decreases the hydraulic pressure at the center area 140, which, in turn, increases centripetal flow 150, which, in turn, amplifies the vortex current all over again, and so on. Thus, the above results in a steady and continuous vortex current 130.

Vortex current 130 provides a "carrier" current, on which the helical air bubble current may ride to the surface of the fluid in the nutrient solution reservoir container 10. The helical air bubble current is the air-injected fluid exiting from restriction segment 104. To effect a helical air bubble current, the initial launching direction of the helical flow 170 or the trajectory 170 of the helical air bubble current must emanate from at the bottom of nutrient solution reservoir 10 at an angle 175 in the range of 25-45 degrees. Angle 175 is the angle to tangent of cylindrical wall of cylindrical bottom 12 in the acute direction. See FIG. 12 for a depiction of angle 175. With the initial launching of the helical air bubble current on trajectory 170 at angle 175, the helical air bubble current enters the vortex flow 130 at a strategic point to effect a circular counterclockwise current. As this circular motion occurs, the air bubble current stream is also rising as the air bubbles are much lighter than the fluid. The sum of these two motions yields a helical air bubble current traveling upwards to the surface of the fluid. The helical flow path of the air bubble current maximizes the contact time of the air in the fluid and also increases the surface area of the air in contact with the fluid, thereby increasing the amount of dissolved oxygen in the fluid.

Vortex current tuning valve 120 may be used to adjust the shape of the helix of the helical air bubble current. Adjustment in the open direction causes an increase in vortex current. An increase in vortex flow yields a tighter helix, causing the air bubble current to migrate radially inward towards the center 140 of the vortex. Adjustment in the close direction causes a decrease in vortex current. A decrease in vortex flow yields a looser helix, causing the air bubble current to migrate radially outward towards the walls of cylindrical bottom 12. The optimum shaped helix is a spiral up the bisect of the radius of cylindrical bottom 12. Vortex tuning valve should be adjusted to attain this helical air bubble current.

Substantially elevated dissolved oxygen levels are attained with this invention. With the above design, after about 15 minutes of initial circulation after first powering on the low power water pump 70, a dissolved oxygen level of 92-97 percent may be continuously maintained in the highly oxygenated nutrient solution 20. This high level of dissolved oxygen substantially increases mineral absorption along with a corresponding increase in photosynthesis of the plant, thereby yielding a substantially increased rate of plant growth.

What is claimed:

1. A hydroponic plant container comprising:
a nutrient solution reservoir container with an upper opening;
a volume of highly oxygenated nutrient solution;
a growing media basket with liquid drainage holes therein,
a volume of porous growing media capable of absorbing liquid;
a water pump; and
a hydro valve assembly, comprising: an influent channel, a plant feed segment, a restriction segment, an air intake segment, and an air injection point, wherein,
said volume of highly oxygenated nutrient solution is contained within said nutrient solution reservoir container,
said volume of porous growing media is contained within said growing media basket,
said growing media basket rests partially within said opening of said nutrient solution reservoir container,
said hydro valve assembly is located at the bottom of said nutrient solution reservoir container,
said water pump is hydraulically connected to said influent channel to cause the flow of said volume of highly oxygenated nutrient solution therethrough,
said influent channel is hydraulically connected to said plant feed segment to cause the flow of said volume of highly oxygenated nutrient solution therethrough,
said influent channel is hydraulically connected to said restriction segment to cause the flow of said volume of highly oxygenated nutrient solution therethrough,
said restriction segment is a segment of hydraulic flow channel with a reduced effective flow diameter as compared to that of said influent channel to cause the flow velocity of said volume of highly oxygenated nutrient solution to increase therein, thereby causing a reduction in hydraulic pressure therein,
said air intake segment is an air flow chamber hydraulically connected to said air injection point, which is hydraulically connected to said restriction segment,
said reduction in hydraulic pressure causing the suction of air through said air intake segment and through said air injection point to cause air injection into said volume of highly oxygenated nutrient solution flowing inside through restriction segment, and
the effluent flow of said volume of highly oxygenated nutrient solution from said restriction segment is set at a trajectory angle [175] ranging from 25-45 degrees inclusive.

2. A hydroponic plant container comprising:
a nutrient solution reservoir container with an upper opening;
a volume of highly oxygenated nutrient solution;
a growing media basket with liquid drainage holes therein,
a volume of porous growing media capable of absorbing liquid;

a water pump; and a hydro valve assembly, comprising: an influent channel, a plant feed segment, an input funnel segment, an air intake segment, and an air injection point, wherein, said volume of highly oxygenated nutrient solution is contained within said nutrient solution reservoir container, said volume of porous growing media is contained within said growing media basket, said growing media basket rests partially within said opening of said nutrient solution reservoir container, said hydro valve assembly is located at the bottom of said nutrient solution reservoir container, said water pump is hydraulically connected to said influent channel to cause the flow of said volume of highly oxygenated nutrient solution therethrough, said influent channel is hydraulically connected to said plant feed segment to cause the flow of said volume of highly oxygenated nutrient solution therethrough, said influent channel is hydraulically connected to said input funnel segment to cause the flow of said volume of highly oxygenated nutrient solution therethrough, said input funnel segment is a segment of hydraulic flow channel with a reduced effective flow diameter at one end as compared to that of said influent channel to cause the flow velocity of said volume of highly oxygenated nutrient solution to increase therein, thereby causing a reduction in hydraulic pressure therein, said air intake segment is an air flow chamber hydraulically connected to said air injection point, which is hydraulically connected to said input funnel segment, said reduction in hydraulic pressure causing the suction of air through said air intake segment and through said air injection point to cause air injection into said volume of highly oxygenated nutrient solution flowing through said input funnel segment, and the effluent flow of said volume of highly oxygenated nutrient solution from said input funnel segment is set at a trajectory angle [175] ranging from 25-45 degrees inclusive.

3. A hydroponic plant container comprising:

a nutrient solution reservoir container with an upper opening;

a volume of highly oxygenated nutrient solution;

a growing media basket with liquid drainage holes therein, a volume of porous growing media capable of absorbing liquid;

a water pump; and a hydro valve assembly, comprising: an influent channel, a plant feed segment, an output funnel segment, an air intake segment, and an air injection point, wherein, said volume of highly oxygenated nutrient solution is contained within said nutrient solution reservoir container, said volume of porous growing media is contained within said growing media basket, said growing media basket rests partially within said opening of said nutrient solution reservoir container, said hydro valve assembly is located at the bottom of said nutrient solution reservoir container, said water pump is hydraulically connected to said influent channel to cause the flow of said volume of highly oxygenated nutrient solution therethrough, said influent channel is hydraulically connected to said plant feed segment to cause the flow of said volume of highly oxygenated nutrient solution therethrough, said influent channel is hydraulically connected to said output funnel segment to cause the flow of said volume of highly oxygenated nutrient solution therethrough, said output funnel segment is a segment of hydraulic flow channel with a reduced effective flow diameter at one end as compared to that of said influent channel to cause the flow velocity of said volume of highly oxygenated nutrient solution to increase therein, thereby causing a reduction in hydraulic pressure therein, said air intake segment is an air flow chamber hydraulically connected to said air injection point, which is hydraulically connected to said output funnel segment, said reduction in hydraulic pressure causing the suction of air through said air intake segment and through said air injection point to cause air injection into said volume of highly oxygenated nutrient solution flowing through said output funnel segment, and the effluent flow of said volume of highly oxygenated nutrient solution from said output funnel segment is set at a trajectory angle [175] ranging from 25-45 degrees inclusive.

\* \* \* \* \*